April 25, 1950 H. E. OVERACKER 2,505,572
TUNING UNIT
Filed Nov. 27, 1945
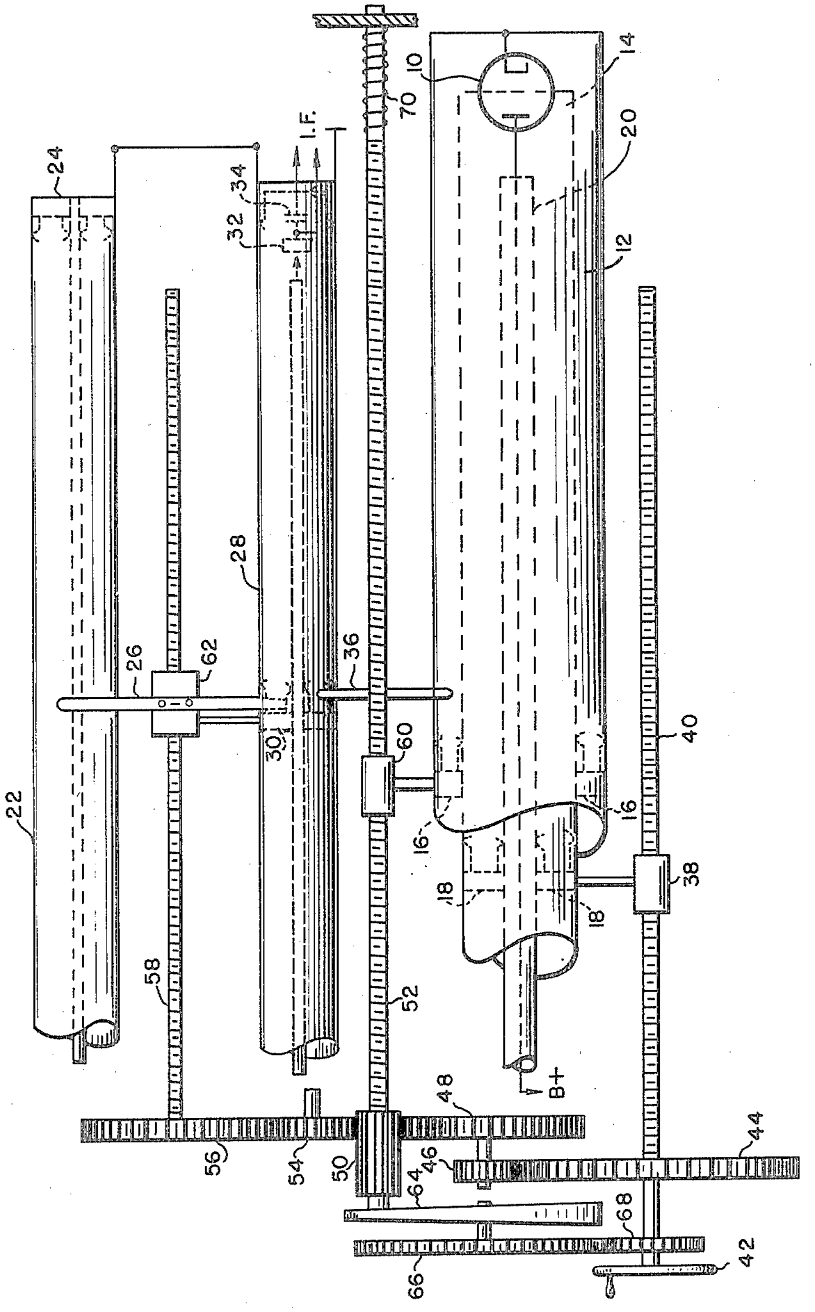
INVENTOR.
HORACE E. OVERACKER
BY
William D. Hall.
ATTORNEY Patented Apr. 25, 1950 2,505,572

UNITED STATES PATENT OFFICE 2,505,572

TUNING UNIT

Horace E. Overacker, Cambridge, Mass., assignor to the United States of America as represented by the Secretary of War Application November 27, 1945, Serial No. 631,184

2 Claims. (Cl. 250—20)

This invention relates generally to electrical apparatus and more particularly to a means for tuning a broad band, very high frequency radio receiver.

In many applications it is desirable to provide a radio receiver which may be adapted to receive signals of a given frequency, which frequency may be varied over a wide range. At low frequencies, tuning is accomplished by varying conventional circuit elements, such as capacitors or inductors; however, at the very high frequencies at which energy is transmitted more efficiently by wave guides or coaxial transmission lines, tuning may be conveniently accomplished by varying the lengths of these elements. One type of local oscillator employed at very high frequencies incorporates a vacuum tube known as a lighthouse triode. This vacuum tube has its electrodes spaced very closely together in order to reduce the effect of electron transit time, which would normally cause difficulties at these high frequencies. The tuned plate and grid circuits of this triode oscillator may be formed by resonant cavities. The oscillator may then be tuned by varying the dimensions of these cavities by means of a movable plunger or shorting plug.

At least three adjustments are generally included in tuning a radio receiving system of the type mentioned above, namely, tuning the R.-F. input circuit, tuning the mixer or converter, and tuning the local oscillator. It would be convenient to accomplish these three adjustments simultaneously by varying one control mechanism.

It is accordingly an object of the present invention to provide a means of simultaneously tuning the R.-F. input circuit, the mixer circuit, and the local oscillator of a radio receiver adapted to be employed at very high frequencies. It is a further object to arrange this tuning means as an integral unit, which may easily be replaced by similar units covering different frequency ranges so that the overall frequency range of the receiver may be made large.

The invention comprises generally an apparatus in which the various coaxial transmission lines and resonant cavities are arranged in parallel fashion so that simultaneous tuning may be accomplished by a relatively simple arrangement of gears and couplings.

Further objects, features and advantages of this invention will suggest themselves to those skilled in the art and will become apparent from the following description of the invention taken in connection with the accompanying drawings in which the single figure is a diagrammatic crosssectional representation of one embodiment of the invention.

In the figure a triode 10, of the type referred to above, and resonant cavities 12 and 14 together form a high frequency oscillator. Cavity 12 forms the tunable resonant element between the cathode and grid, and cavity 14 that between the plate and grid of this triode. These cavities may be coaxial cylinders located one inside the other as shown. Cavity 12 is terminated by a shorting plunger 16, while cavity 14 is terminated by a similar plunger 18. The plate voltage for triode 10 is supplied through an insulated conductor contained inside a cylindrical tube 20, which forms the inner wall of cavity 18.

R.-F. energy from the antenna of the system enters through a coaxial transmission line 22, which is shorted at one end by a plunger 24. Antenna line 22 is so proportioned as to have, for example, a 50-ohm characteristic impedance and a length of at least three-fourths of the wave length of the lowest operating frequency of the unit. A sliding contact 26 makes contact with the central conductor of line 22 by passing through a longitudinal slit in the outer conductor of this line. By a similar arrangement in a coaxial mixer line 28, the other end of sliding contact 26 is connected to a movable shorting plunger 30. Two parallel metal plates (not shown) are arranged one on either side of sliding contact 26, and extend between antenna line 22 and mixer line 28 for the entire length of these lines. The plates electrically connect the outer conductors of the two lines. The width, the thickness, and the separation of sliding contact 26 from these plates is such as to produce an equivalent transmission line of 50 ohms characteristic impedance between the central conductors of coaxial lines 22 and 28.

Mixer line 28 is similar to antenna line 22 in that it has a characteristic impedance of 50 ohms and its length is maintained at substantially three-fourths of the wave length of the operating frequency by shorting plunger 30. The central conductor of mixer line 28 is connected in series with a crystal 32 and one terminal of a capacitor 34, the other terminal of the latter being connected to the outer conductor of the mixer line. Also attached to plunger 30, but electrically insulated from it, is a closed coupling loop 36, the other end of which passes through a longitudinal slit into cavity 12.

Plunger 18 is rigidly connected to a threaded traveling bracket 38 mounted on a lead screw 40, which is turned by a handwheel 42. Lead screw 40 is connected by a gear train consisting of gears 44, 46, 48, and 50 to a second lead screw 52. Gear 50 is made sufficiently wide to permit longitudinal motion thereof while remaining meshed with its cooperating gears 48 and 54, the latter engaging a gear 56 mounted on a lead screw 58. Shorting plunger 16 is rigidly connected to a threaded traveling bracket 60 mounted on lead screw 52, and a similar threaded bracket 62 mounted on lead screw 58 is connected to sliding contact 26 and shorting plunger 30. All of these shorting plunger attachments are made through narrow longitudinal slits in the outer walls of the appropriate lines or cavities.

Lead screw 52 is mounted so as to be capable of a longitudinal as well as a rotary movement. This longitudinal motion is produced by the rotation of a cam 64, connected by gears 66 and 68 to lead screw 40. A return spring 70 mounted on one end of lead screw 52 serves to keep the opposite end of this lead screw in contact with cam 64.

When the apparatus is in operation, the rotation of handwheel 42 is transmitted to lead screws 40, 52, and 58, which in turn vary the positions of plungers 16, 18 and 30 and of sliding contact 26. Antenna line 22 is tuned by moving the sliding contact 26 to a position three-fourths of a wave length from shorting plug 24. This is to insure that sliding contact 26 will be at a maximum of R.-F. voltage and hence a maximum R.-F. signal will be coupled into mixer line 28. The local oscillator output is coupled from cavity 12 into mixer line 28 through coupling loop 36. Due to the mixing action of crystal 32, an I.-F. output is produced across capacitor 34, which serves as an R.-F. bypass capacitor. The gear ratios are so chosen that the difference between the frequency to which antenna line 22 is tuned and the frequency to which the local oscillator is tuned is continually equal to the fixed I.-F. frequency.

For proper operation of the local oscillator, a non-linear divergence of the resonant positions of shorting plungers 16 and 18 is necessary. The thickness of cam 64 is so varied that as the cam rotates, it produces a longitudinal displacement of lead screw 52 which, when transmitted to plunger 16, is of the proper magnitude correctly to position this plunger with respect to plunger 18. In other words, an approximate gear ratio has been selected to meet the linear divergence requirements of plungers 16 and 18, and more accurate tuning depends upon additional longitudinal displacement supplied by cam 64.

It will be obvious that the arrangement of the component parts shown in the drawing has been chosen for simplicity of presentation, and that actual arrangement of parts in the apparatus would be such as to occupy a minimum of space and to obtain the maximum operating efficiency. Any similar arrangement of gears, lead screws and cams may be employed to give results consistent with the requirements of the system. The particular embodiment shown is merely a simple example of such an arrangement.

It will also be obvious that the dimensions of the apparatus may be chosen to cover a convenient frequency range. If a greater range is desired for a given receiver, similar units may be designed, the dimensions of which are such that they cover other portions of the desired total frequency range. A desired portion of the entire band may then be covered by inserting the proper tuning unit in the receiver system.

While there has been described what is at present considered to be the preferred embodiment of the invention, it will be obvious to those skilled in the art that various changes and modifications may be made therein without departing from the scope of the invention.

The invention claimed is:

1. In combination, a coaxial input transmission line, a coaxial mixer transmission line, a first coupling means for coupling energy from a given point on said input transmission line to a given point on said mixer transmission line, a radio frequency oscillator including two tunable resonant cavities, a second coupling means for coupling radio frequency energy from one of said cavities of said oscillator to said mixer transmission line at said given point on said line, means for rectifying the resultant voltage produced in said mixer transmission line and obtaining therefrom an intermediate frequency voltage, first and second adjustable plungers for respectively tuning said two resonant cavities of said oscillator, a first lead screw, a first threaded bracket traveling on said first lead screw and attached to said first and second coupling means for adjusting the positions thereof, a second lead screw capable of longitudinal as well as rotary displacement, a second threaded bracket traveling on said second lead screw and attached to said first adjustable plunger for varying the position thereof, a third lead screw, a third threaded bracket traveling on said third lead screw and attached to said second adjustable plunger for varying the position thereof, and means for imparting to said first, second, and third lead screws rotary motions of predetermined relative magnitudes and for imparting to said second lead screw a longitudinal motion having a predetermined relation to said rotary motions.

2. In combination, a coaxial input transmission line, a coaxial mixer transmission line, first coupling means for coupling energy from a given point on said input transmission line to a given point on said mixer transmission line, a radio frequency oscillator including two tunable resonant cavities, a second coupling means for coupling radio frequency energy from one of said cavities of said oscillator to said mixer transmission line at said given point on said line, means for rectifying the resultant voltage produced in said mixer transmission line and for obtaining therefrom an intermediate frequency voltage, first and second adjustable plungers for respectively tuning said first and second resonant cavities of said oscillator, and means for imparting to said first and second adjustable plungers and said first and second coupling means linear motions of predetermined relative magnitudes and for imparting to one of said adjustable plungers an additional displacement of predetermined magnitude.

HORACE E. OVERACKER.

REFERENCES CITED

The following references are of record in the file of this patent:

UNITED STATES PATENTS

| Number | Name | Date |
|---|---|---|
| 1,907,555 | Moulton | May 9, 1933 |
| 2,227,604 | Smith | Jan. 7, 1941 |
| 2,303,388 | Pray | Dec. 1, 1942 |
| 2,408,420 | Ginzton | Oct. 1, 1946 |